United States Patent [19]

Furukawa et al.

[11] 4,439,784

[45] Mar. 27, 1984

[54] POWER CUTTING DEVICE FOR TERMINAL UNITS OF CATV SYSTEM

[75] Inventors: Hajime Furukawa; Yoshitsugu Ohta, both of Tokyo, Japan

[73] Assignee: Pioneer Electronic Corporation, Tokyo, Japan

[21] Appl. No.: 191,206

[22] Filed: Sep. 26, 1980

[30] Foreign Application Priority Data

Sep. 26, 1979 [JP] Japan .................. 54-123549

[51] Int. Cl.³ .............................................. H04N 7/18
[52] U.S. Cl. ...................... 358/86; 358/190;
455/4; 455/5; 340/825.07; 340/310 A
[58] Field of Search ................. 358/86, 153, 190, 194,
358/210; 455/4, 5; 361/81; 340/825.07, 310 A

[56] References Cited
U.S. PATENT DOCUMENTS 3,761,914  9/1973  Hardy et al. ........................ 358/86
3,993,955  11/1976  Belcher et al. ...................... 358/86
4,118,669  10/1978  Fung ................................... 358/114
4,142,156  2/1979  Freund .................................. 455/4
4,367,455  1/1983  Fried ................................... 340/310

FOREIGN PATENT DOCUMENTS 696745   9/1953  United Kingdom ............... 358/114
2039402  8/1980  United Kingdom ........... 340/310 A Primary Examiner—John C. Martin
Assistant Examiner—Edward L. Coles
Attorney, Agent, or Firm—Sughrue, Mion, Zinn, Macpeak & Seas

[57] ABSTRACT

In a CATV system, power supplies of television sets associated with all terminal units are cut in response to an instruction contained in a down-data signal supplied by a central facility of the system. It is possible to cut the power supplies of the television sets, selectively and periodically, by incorporating address informations in the down-data signal.

3 Claims, 12 Drawing Figures

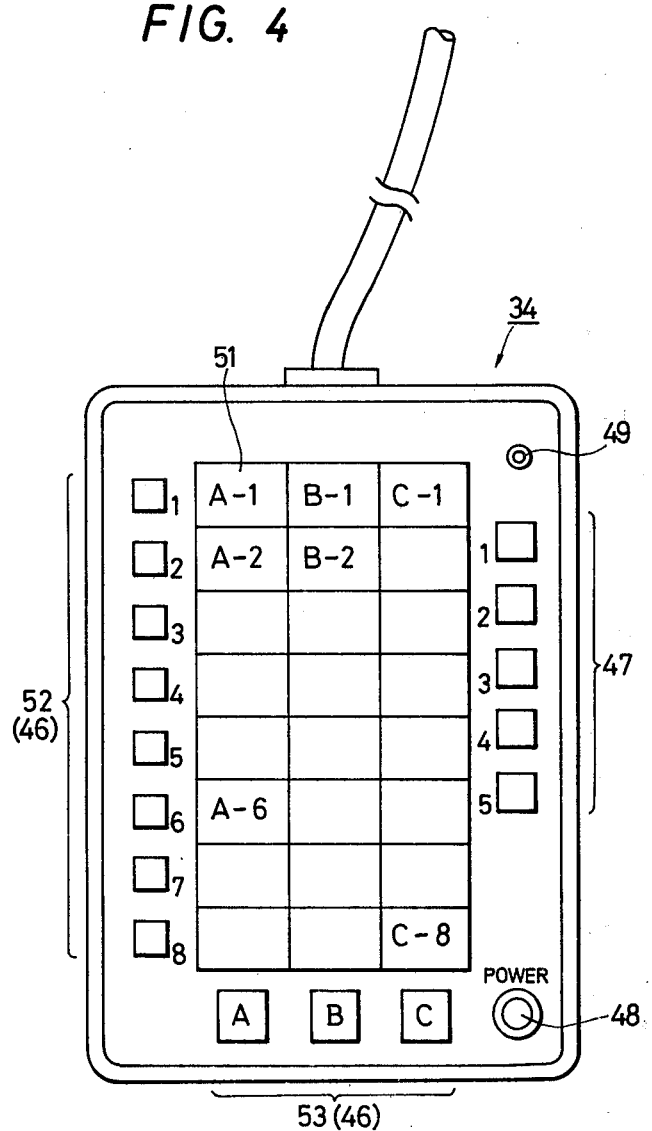

FIG. 5

HOW TO USE THIS CATV SYSTEM

This TV set can be operated as follows: First, switch on ......

LIST OF TODAY'S PROGRAMS
1.
2.
3.
4.
5.

FIG. 6

ATTENTION

Programs are chargeable and each channel has its own fee per one time use.
1. 1,000 yen    5. 800 yen
2.   500 yen    6. 700 yen
3.   500 yen    7. 600 yen
4.   300 yen Procedure for receiving programs is as follows.

FIG. 9

INTRODUCTION OF BI-DIRECTIONAL CATV SYSTEM

1. Date : Sept. 27, 1979
   10:30 - 11:30 A.M.
2. Place : First Meeting Room

All managers should attend.
For confirmation, push button 1.

-General Management-

FIG. 10

Which stereo design is better between those presented up to now.
Push a button of your choice.
 1. Vertical stereo
 2. Horizontal stereo
 3. Neither one

POWER CUTTING DEVICE FOR TERMINAL UNITS OF CATV SYSTEM

BACKGROUND OF THE INVENTION

The present invention relates to a community antenna television (CATV) system and, in particular, to a power cutting device for use in connection with terminal units of the CATV system, which is capable of positively cutting the power source of all of the associated television sets according to a down-data signal supplied thereto by a central facility of the system. It is known that CATV systems are an extremely advantageous communication system which is capable of sending television programs on a plurality of channels through a cable and can accommodate bidirectional simultaneous communications. In such systems, each television set associated with a terminal unit is operated individually to receive desired programs. The terminal unit controls the associated television set.

Occasionally users of of television sets leave them in the on-state even after the programs are over. Also, it occurs that persons who are not permitted to use the television sets operate them. These are disadvantageous in view of the desire to save energy and operating costs and also reduces the lifetime of the television set. Since the switching-off of the power source for individual television sets is performed at the terminals rather than at the central facility, it is impossible to resolve the above problems.

SUMMARY OF THE INVENTION

In view of the foregoing, an object of the present invention is to provide a power cutting device for the terminal units in the CATV system, which can switch off positively and forcibly the power source connection in the television sets associated with the terminal units by sending a down-data signal containing a power source cutting instruction from the central facility of the system to the terminal units to thereby remotely control the television sets.

BRIEF DESCRIPTION OF THE DRAWINGS

FIG. 4 is a plan view of a control unit in the terminal unit;

FIG. 5 is an explanatory diagram showing an example of a display which indicates a procedure for using the CATV system;

FIG. 6 is an explanatory diagram of a pattern which is displayed through a procedure channel when a chargeable program is selected;

FIGS. 9 and 10 are diagrams of patterns which are displayed on the television sets when a special channel is selected.

DESCRIPTION OF THE PREFERRED EMBODIMENTS

A preferred embodiment of the invention will be described with reference to the accompanying drawings. In the embodiment described, a terminal unit including a television set is located, for example, in each of the guest rooms in a hotel so that the guests can observe various programs on the television sets. Two-way communications can be carried out between the television sets and a central facility provided in the hotel.

Figure 1:
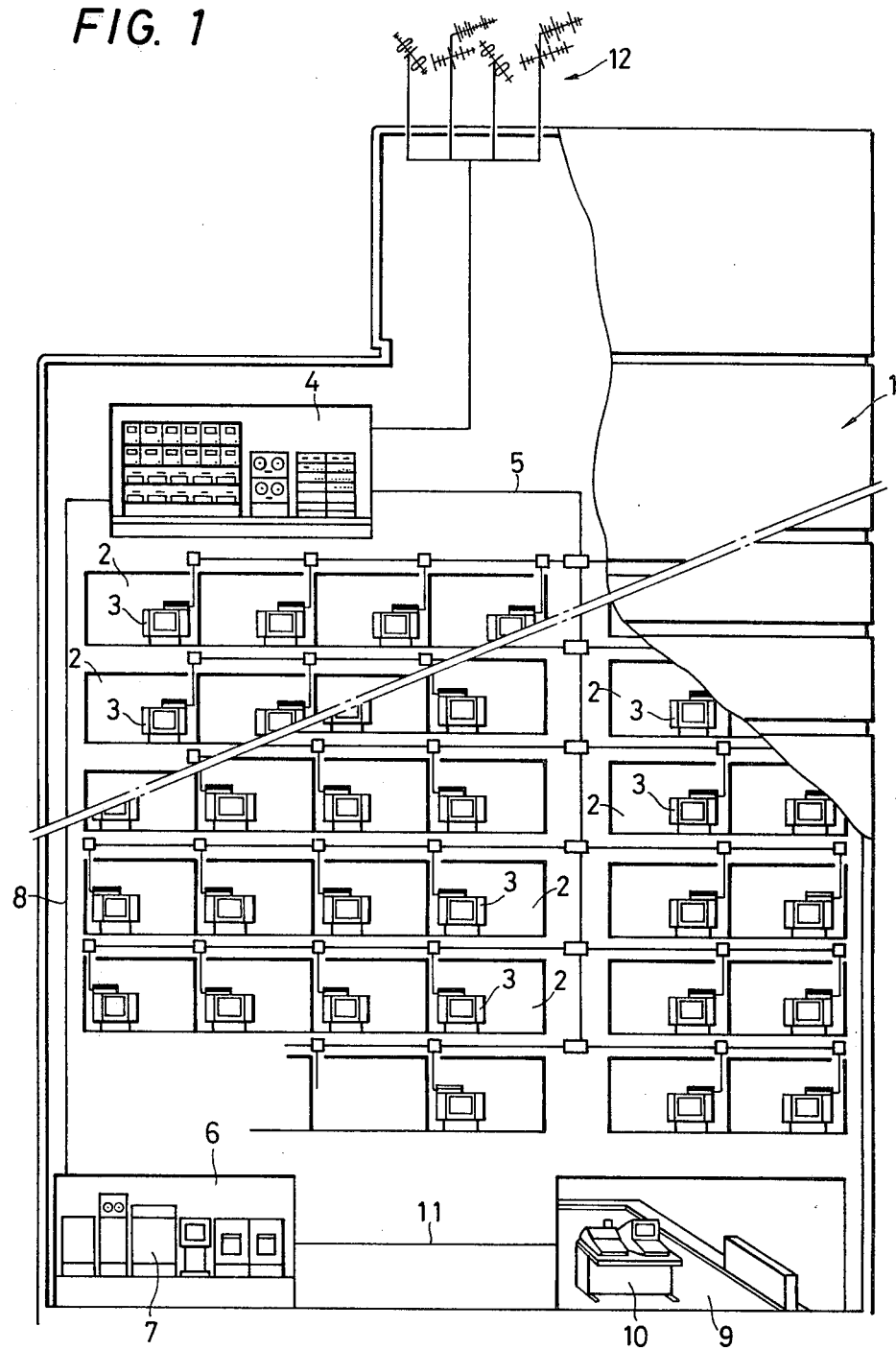
FIG. 1 is a schematic diagram showing a CATV system which is provided in a hotel according to one example of a method of receiving particular channels in a CATV system according to the invention.

FIG. 1 shows the interior of a hotel schematically. A television set 3 forming a part of a terminal unit is provided in each guest room 2 in the hotel 1. The television sets 3 are connected through a cable 5 to a central facility 4, hereinafter referred to merely as "a center" when applicable. The hotel 1 has a computer room 6. A computer 7 in the computer room 6 is connected through a data cable 8 to the center 4. A display unit 10 is provided at the front 9 of the hotel and is connected through a data cable 11 to the computer 7. An antenna 12 is installed on the roof of the hotel for receiving commercial television broadcast signals and it is connected to the center 4.

In this system, the guests in the rooms 2 of the hotel 1 can see and hear television programs by operating the television sets 3. Television broadcast signals received by the antenna 12 are retransmitted through the cable 5 to the television sets 3 and, in addition, programs which are provided independently in the center 4 are also transmitted to the television sets 3. If any one of the television sets 3 is operated, its condition of use is transmitted through the cable 5 to the center 4. The time of use and the channel in use are communicated through the data cable 8 to the computer 7 and are stored therein The times of use are summed by the computer 7 so that, when the guest checks out, he is charged for the usage which is displayed on the display unit 10 at the cashier's station 9. Sometimes, special programs are provided for television channels. In the case where such television channels are used by a guest, the periods of the television channels are summed so that the guest is additionally charged for the special programs when he checks out of the hotel.

Figure 2:
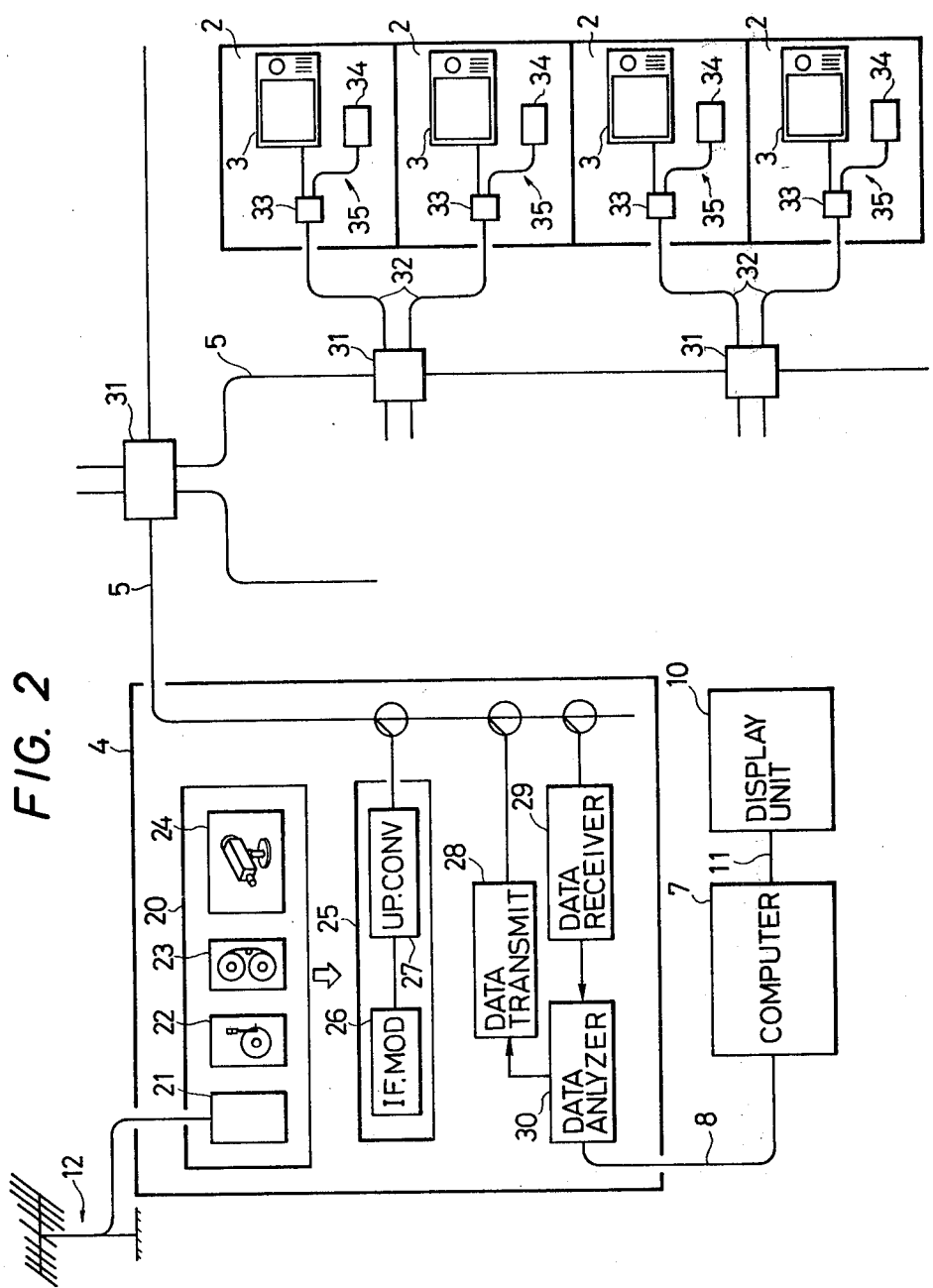
FIG. 2 is a broad block diagram showing the CATV system.

FIG. 2 shows in more detail the two-way data communication network in the embodiment in FIG. 1. The center 4 has a source group 20 including a demodulator 21, a video disc player 22, a video tape player 23, and a studio 24. The antenna 12 is connected to the demodulator 21. The center 4 further has a demodulation output section 25 including an IF modulator circuit and an up-converter circuit 27. The output of the up-converter circuit 27 is connected to the cable 5. The cable 5 is connected to a data transmitter 28 and a data receiver 29 which is connected to a data analyzer 30. A part of the output of the data analyzer 30 is applied, as an instruction signal, to the data transmitter 28 while the other part of the output is applied through the data cable to the computer 7. The computer 7 is connected to the display unit 10 such as a printer display. Branching units 31 are provided at predetermined points on the cable 5 and branch cables 32 extend from each branching unit 31 to the respective guest rooms 2 in the hotel. A terminal unit 35 is composed of a television set 3, a main unit 33 and a control unit 34. The branch cables 32 are connected to the main unit 33 in each guest room 2.

Figure 3A:
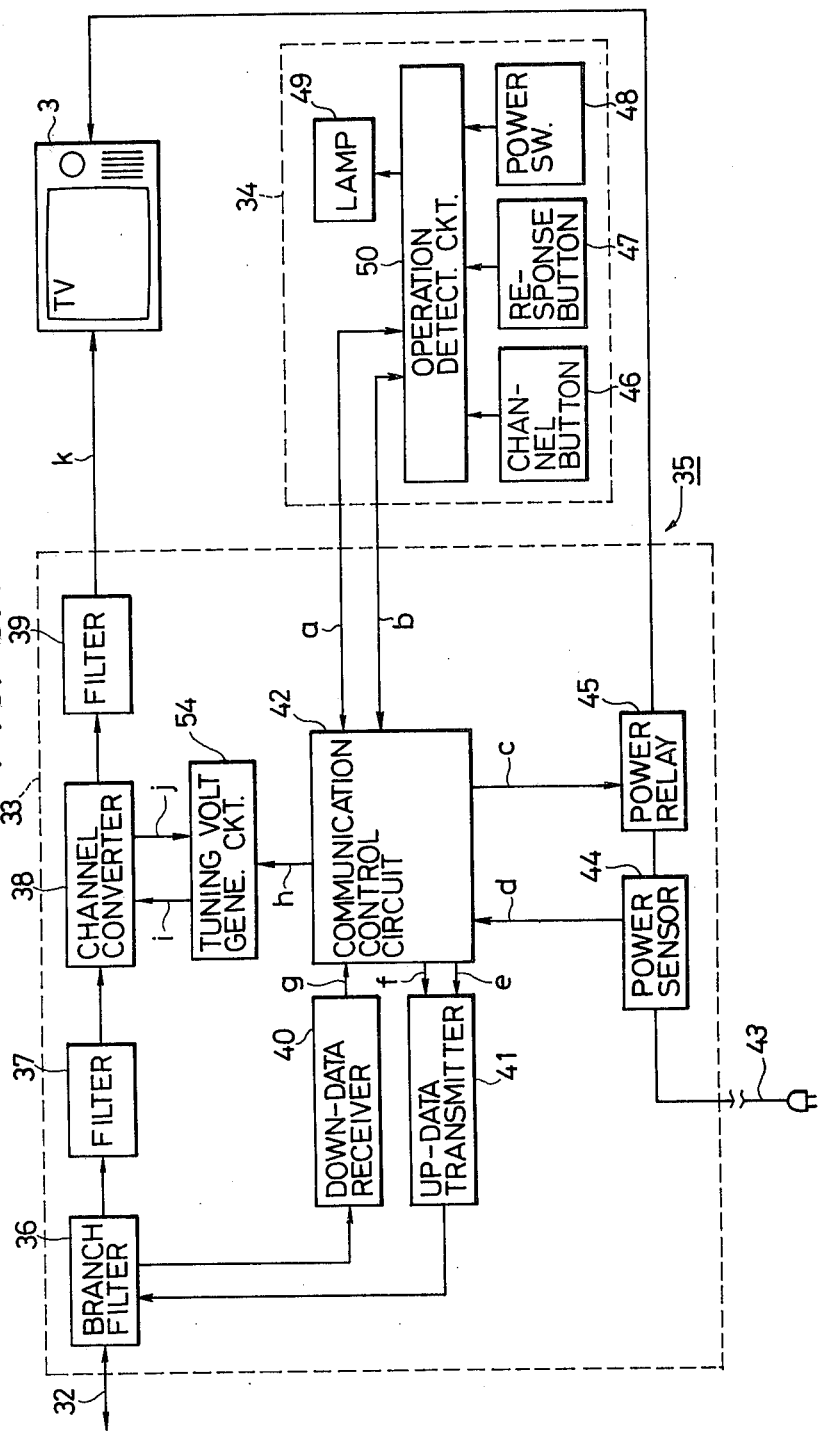
FIGS. 3A to 3C are detailed block diagrams showing a terminal unit in the CATV system in detail.

The circuit of the terminal unit 35 is as shown in FIG. 3A. The main unit 33 includes a series circuit of a branching filter 36, a filter 37, a channel converter 38 and a filter 39. The branching filter 36 is connected to the branch cable 32. The output terminal of the filter 39 is connected to the television set 3. The branching filter 36 is further connected to a down-data receiver 40 and an up-data transmitter 41 both of which are connected to a communication control circuit 42.

Figure 3B:
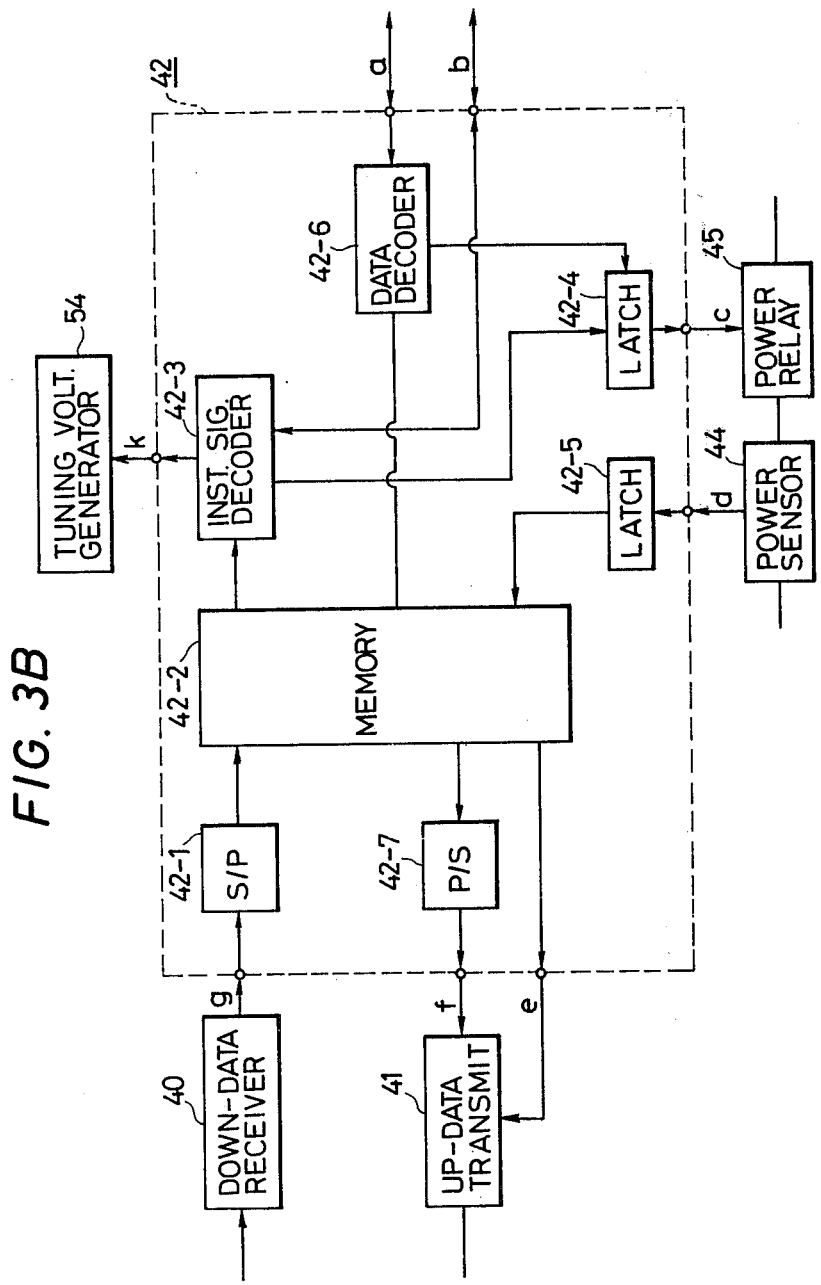

The communication control circuit 42 includes a serial-parallel converter 42-1, as shown in FIG. 3B, which receives a serially coded down-data g from the down-data receiver 40 and converts it into a parallel coded signal. The parallel signal obtained by the converter 42-1 is stored in a memory 42-2. The memory 42-2 further contains address codes corresponding to the respective hotel rooms. At the time of polling, an address signal provided by the center 4 is compared with the address stored in the memory 42-2 and when there is a coincidence therebetween, a response is provided to the center 4.

An output of the memory 42-2 is connected to an instruction signal decoder 42-3 which functions to demodulate the instruction signal etc. supplied by the center 4 and stored in the memory 42-2. In a case where an instruction of spot channel from the center 4, the decoder 42-3 functions to send a control signal k corresponding to the spot channel to the tuning voltage generator 54 and, when the power is not supplied to the television set 3 at that time, to cause a latch circuit 42-4 to supply a control signal c instructing a turning-on of the power relay 45. At this time, an operation information d obtained by the power sensor 44 is supplied to a latch circuit 42-5 and compared with the content of the memory 42-2 to obtain a coincidence thereof with the control signal by which the power relay 45 is turned on.

A power cord 43 which is connected to a commercial electric power outlet is connected through a power sensor 44 and a power relay 45 to the television set 3. The power sensor 44 and the power relay 45 are connected to the communication control circuit 42.

The control unit 34 includes a channel button section 46, response buttons 47, a power switch 48 and a message lamp 49 all of which are connected to an operation detecting circuit 50 which is, in turn, coupled to the aforementioned communication control circuit 42.

Figure 3C:
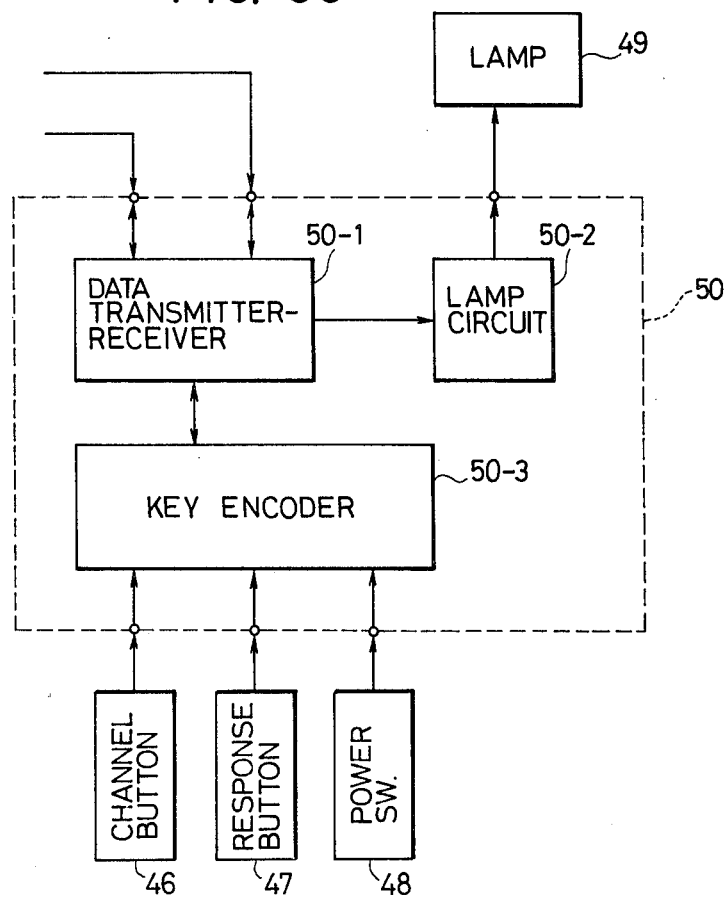

The operation detecting circuit 50 includes a data transmitter-receiver 50-1, a lamp circuit 50-2 and a key encoder 50-3 as shown in FIG. 3C.

When the channel button 46 is changed, the response button 47 is turned on or the power switch 48 is turned on, information corresponding thereto is supplied to the key encoder 50-3 which provides a serial data output indicating the switch operated. This serial data is supplied to the data transmitter-receiver 50-1 from which the control signal a indicating the status of the respective switches 46 to 48 is sent to the comminucation control circuit 42.

FIG. 4 shows the upper part of the control unit 34. Provided at the central portion of the control unit 34 is a channel table 51 composed of blocks arranged in three rows and eight columns. Line buttons 52 arranged vertically in one row are provided on the left-hand side of the channel table 51 and column buttons 53 arranged horizontally in one row are provided below the channel table 51. The line buttons 52 and the column buttons 53 are provided respectively for the blocks in the channel table 51. That is, the aforementioned channel button section 46 includes the buttons 52 and 53. The response buttons 47 arranged vertically in one row are provided on the right-hand side of the channel table 51. The message lamp 49 is provided above the response buttons 47 and the power switch is disposed below the response buttons 47. The number of line buttons 52 in this example is eight, the number of column buttons 53 is three, and the number of response buttons is five.

The above-described embodiment of the invention operates as follows with the operations of the various sections successively described:

(1) Transmission of the video signals from the center 4

A variety of television programs are simultaneously produced in the source group 20 and their video signals are applied to the modulation output section 25. The television programs provided by the source group 20 can be classified into a chargeable program, a guide/information program, and a retransmission program as described below. For each of the three kinds of programs, eight channels are provided. That is, twenty-four channels are available.

(A) Chargeable program

This program includes new movie programs and special programs, i.e. programs provided from the video disc player 22 or the video tape recorder 23 or live broadcast programs produced in the studio 24. A user who has watched chargeable programs is charged according to the number of times of watching or the period of time of watching.

(B) Guide/information program

This program includes various guide and information programs which are useful for guests in the hotel such as those concerning the facilities in the hotel, town sightseeing, telephone dial guides, weather forecast, traffic information, and news. These programs are transmitted repeatedly all day long.

(C) Retransmission program

Television broadcast signals received by the antenna 12, after being demodulated by the demodulator 21, are applied to the modulation output section 25. In this operation, programs transmitted from local television stations are outputted as they are. That is, completely the same programs as those received by the ordinary television sets are retransmitted.

The television program video signal is applied by the source group to the modulation output section 25 where it is modulated by the IF modulator circuit 26. In order to assign the signal thus modulated to the designated channel, the frequency of the signal is increased to a predetermined value by the up-converter 27 according to the frequency of the channel selected therefor. The video signal thus assigned to the respective channel is transmitted through the cable 5.

In the manner described above, the television program video signals of twenty-four channels are transmitted through the cable 5. In addition to the twenty-four channels, there are provided information transmitting channels. These channels can be classified as follows according to their functions:

| (a) General broadcast channels | Total 24 channels |
|---|---|
| Chargeable channels | 8 channels |
| Guide/information channels | 8 channels |

|  | -continued | |
|---|---|---|
|  | Retransmission channels | 8 channels |
| (b) | Procedure channel | 1 channel |
| (c) | Spot channel | 1 channel |
| (d) | Special channels | Total 4 channels |
|  | Rental channels | 2 channels |
|  | Business channels | 2 channels |

Thus, video signals of thirty channels in total are transmitted from the modulation output section 25 to the television sets 3. However, each terminal unit 35 can select the twenty-four general broadcast channels only, but cannot select the remaining six channels.

(2) Polling from the center 4

At the center 4, the data transmitter 28 periodically transmits data signals over the cable 5, to determine the operating conditions of the terminal units 35. The terminal units 35 have address numbers, respectively. The data transmitter 28 outputs retrieving signals individually at predetermined time intervals to call the terminal units 35 with their particular address numbers thereby to detect what channel is received at the time of retrieval. In response to this retrieving signal, each terminal unit 35 answers back to the center the channel which was received by the television set at the time of arrival of the retrieving signal. Summation of rental fees according to the time of use and calculation of additional fees for special programs can be readily and quickly achieved thereby. The data signals from the data transmitter 28 include instruction signals for controlling the terminal units 35 whereby the television sets can be remote-controlled as described below.

(3) Operation (video signal reception) of the television set 3

The operation of the television set 3 is started by drepressing the power switch 48. The operation detecting circuit 50 detects the depression of the power switch 48 to provide a control signal a. The control signal a is applied to the communication control circuit 42 which in turn applies a power source control signal c to the power relay 45. As a result, the power relay 45 is turned on to supply electric power to the television set 3. It is detected by the power sensor 44 whether or not electric power is correctly applied to the television set 3 through the power relay 45 as a result of which an operation information signal d is applied to the communication control circuit 42 by the power source 44 so that it is determined whether or not the television set 3 is correctly operated by the operation of the power switch 48. In this operation, none of the controls on the television set need be operated. That is, all the operations that are required for the television set 3 to receive video signals are carried out with the control unit 34. For this purpose, the channel selector of the television set 3 is fixedly set to a particular channel, for instance, Channel 2.

The center 4 transmits the video signal through the cable 5, the branching units 31, and the branch cable 32 to the main unit 33. The video signal is applied through the branching filter 36 and the filter 37 to the channel converter 38, in the main unit 33. The frequency of the video signal is converted into the frequency of the particular channel by the channel converter 38 and is then applied through the filter 39 to the television set 3. The video signal is reproduced by the television set so that the television program can be seen on the television set.

(4) Selection of channels

A desired channel can be selected by depressing one of the line buttons 52 and one of the column buttons 53 on the control box 34 shown in FIG. 4. That is, one of the blocks of the channel table 51 can be selected by so doing. This operation corresponds to the operation of the channel button section 46 which operation is detected by the operation detecting section 50 as a result of which the control signal a is provided by the section 50. The control signal a is applied to the communication control circuit 42 which in turn applies a channel signal to a tuning voltae generating circuit 54 so that a tuning voltage i corresponding to the selected channel is generated therein. The tuning voltage i is applied to the channel converter 38. The channel converter 38 generates a local oscillation signal whose frequency is in correspondence to the tuning voltage i so that the frequency of the received video signal is converted into that of the selected channel. The local oscillation frequency j of the channel converter 38 is fed back to the tuning voltage generating circuit 54 thus forming a PLL (phase-locked loop) to stabilize the frequency.

(5) System operating guide

As described above, the television set 3 is operated by turning on the power switch 48. In this operation, no matter what channel is selected by the channel button section 46, the communication control circuit 42 operates the tuning voltage generator 54 so that the guide-/information channel B-1 is tuned in. Upon tuning in of the channel B-1, the guide for using the CATV system is displayed and the instructions for operating the control unit and for receiving broadcast programs are displayed as shown in FIG. 5. This is to allow persons who are not familiar with the CATV system to readily understand how to operate it and to prevent erroneous operation. After the user instructions have been displayed with the channel B-1, the line buttons 52 and the column buttons B and C (among the column buttons 53) are selectively operated to receive the guide/information programs and the retransmission programs.

(6) Method of receiving chargeable programs

The chargeable programs can be received by operating the button A among the column button 53. In combination with the row buttons 52, the chargeable programs of eight channels can be received. Since all the guests are not expected to know that the channels in the column A are chargeable, it is necessary to inform them of the fact that these programs are chargeable before they receive them. That is done by displaying the message "You will be charged for the use of this channel" or the like in order to prevent a problem which otherwise might be caused when they are requested to pay for the reception of the chargeable programs.

That is, even if, after the instructions for operating the system have been introduced with the channel B-1, one of chargeable programs is selected by operating one of the row buttons 52 and the button A of the column buttons 53, the chargeable program thus selected cannot be received immediately and a reconfirmation or precaution message, as shown in FIG. 6, is displayed on the screen of the television set. This display is carried out by the procedure channel. When the operation detecting circuit 50 transmits to the communication control circuit 42 the control signal a representative of the selection of a chargeable program, the communication control circuit 42 causes the tuning voltage generator 54 to operate the channel converter 38 so that the procedure channel is received. After the reception of the chargeable program has been confirmed, a predetermined procedure is carried out, that is, in this case, the guest is intended to receive the "chargeable" program. The procedure is, for instance, as follows:

(a) Upon selection of a chargeable channel, the aforementioned confirmation display appears on the screen of the television set and the message lamp is turned on.
(b) The message lamp is turned off.
(c) Then, among the response switches 47, a specified switch is depressed once or twice.

With the above-described operations, the guest's intention to receive the program can be confirmed and the chargeable channel is then made available for him. That is, the communication control circuit 42 determines the guest's intention from the data signal b from the tuning voltage generator 54 and applies a tuning voltage predetermined for the chargeable program's channel to the channel converter 38. Thus, the chargeable program can be received. If, when the present chargeable program being received is changed to another chargeable program, the same procedure described above is carried out, it can be more positively confirmed that the reception of the program is chargeable.

(7) Operation of the spot channel

Figure 7:
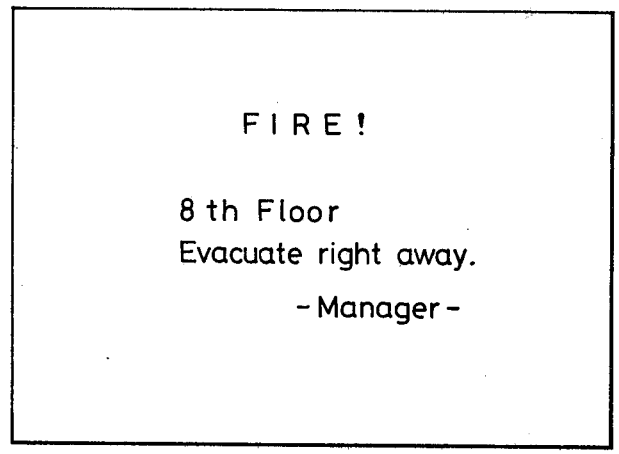
FIGS. 7 and 8 are also explanatory diagrams of patterns which are displayed through a spot channel which is forced to be received by television sets in the CATV system.

The spot channel is used to allow particular information to appear in the entire area or a particular part of the entire area of the picture tube of the television set. For instance, it is necessary to inform all of the guests of the occurrence of a fire. In this case, if a message as shown in FIG. 7 is made on the television sets, then the guests in the hotel can know of the fire through their television sets.

In transmission of such information, the data transmitter 28 in the center 4 applies a down-data signal carrying spot information to each of the main units 33. This down-data signal is applied, as down-data g, to the communication control circuit 42 through the branching filter 36 and the down-data receiver 40 whereupon the communication control circuit 42 applies the control signal h to the tuning voltage generator 54 so that a tuning voltage i corresponding to the spot channel frequency is inputted to the channel converter 38. As a result, a television set receiving any channel is forced to receive the spot channel. In the case when the television set is not switched on, the communication control circuit 42 applies the control signal c to the power relay 45 so as to forcibly operate the television set 3. Thus, the information as shown in FIG. 7 is transmitted to the guests through all of the television sets.

Figure 8:
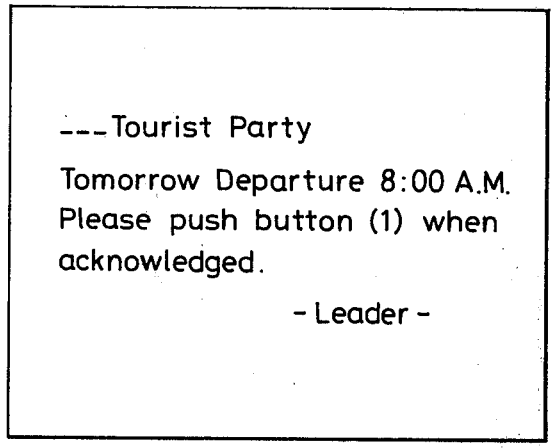

Sometimes, it is necessary to inform a particular guest only of spot information. For instance, sometimes it is necessary to inform only a tourist party of a particular message as shown in FIG. 8. In this case, as the rooms 2 for the tourist party are known, the address numbers of the terminal units 35 in the rooms and the down-data signal are transmitted by the data transmitting 28 in the center. As a result, only the terminal units 35 corresponding to the address numbers are forcibly operated so that the information is transmitted to the tourist party only.

(8) Response to the spot channel

In the case where, as was described above, all of or some of the terminal units 35 are forcibly operated to cause the television sets to receive the spot, sometimes it is necessary to ensure whether the guests have received the information or not. For this purpose, the center 4 transmits to the terminal units 35 the down-data signal including answer-requesting data.

This down-data signal is applied through the down-data receiver 40 to the communication control circuit 42 and the control circuit 42 is set to receive an answer. In other words, the data signal b is applied to the operation detecting circuit 50 to turn on the message lamp 49 so that the preparation for an answer has been accomplished while a message is displayed on the television sets so that the specified response buttons 47 can be depressed by the guests. The depression of the specified response button 47 is detected by the operation detecting circuit 50 so that the data signal b is applied to the communication control circuit 42. When the reception of the information has been confirmed by depressing the response button 47, the communication control circuit 42 supplies the data signal f and the control signal e to the up-data transmitter 41 which supplies, in turn, the up-data signal to the center 4. The up-data signal includes the address number peculiar to the terminal unit 35. These up-data signals are received by the data receiver 29 and the contents thereof are analyzed by the data analyzer 30 so that the terminal units which have carried out the confirmation operation of the reception of the information can be determined. The determination results are applied through the computer 7 to the display unit 10 where they are displayed immediately so that the terminal units 35 which have made the confirmation operation can be acknowledged readily.

Upon operation of the response button 47, the communication control circuit 42 applies the signal h to the tuning voltage generator 54 so that the tuning voltage i of the channel which has been received is applied to the channel converter 38 as a result of which the present channel is switched over to the channel which has been received. Thus, the same television program can be received continuously except for the period of time that the information has been transmitted. In the case where the television set 3 has been forcibly operated as described above, the power relay 45 is turned off to stop the operation of the television set 3.

(9) Reception of the special channels

As described above, programs of four special channels are outputted by the modulation output section 25. However, these channels are not included in the channel table 51 shown in FIG. 4 and accordingly they cannot be received even by operating the channel buttons 46. The channels can be received upon a particular instruction from the data transmitter 28 in the center 4. That is, data permitting the reception of the special channel is added to the down-data signal from the data transmitter 28. As each terminal unit 35 has its own address number, the data permitting the reception of the special channel can be transmitted to selected terminal units 35 using the address numbers. Upon reception of the special instruction, in the terminal unit 35, the communication control circuit 42 operates to apply the signal h to the tuning voltage generator 54 so that the particular channel can be received when a particular channel is selected by operating the channel button section 46. That is, when a particular channel, for instance, the channel B-8 on the channel table 51 which has been specified in advance is selected, the terminal unit 35 operates to receive the program of the special channel instead of the program which was originally assigned to the channel B-8. Thus, in the communication control circuit 42 of the terminal unit 35 which has received the particular instruction, the tuning voltage generator 54 is so controlled that the television set is tuned to the frequency of the special channel when the channel B-8 is selected. Accordingly, in a terminal 35 which can receive the special channel, one of the television programs assigned to the channel table 51 cannot be received.

The special channels include, for instance, rental channels and business channels. The rental channels will be described. The rental channels are chargeable channels which are rented by time so that, for instance, meeting of learned societies, lecture meetings, wedding ceremonies and other meetings can be watched in the rooms. In this case, vdieo signals from the television camera in the studio or in the meeting place are sent to the modulation output section 25 where the frequency thereof is converted into that of a special channel and the video signals thus treated are transmitted to the terminal units 35 in the designated rooms 2 so that the guests in the rooms 2 can receive the special channel. When the rental time of the rental channel has passed, the data transmitter 28 outputs a special channel reception terminating instruction together with the relevant address number so that the communication control circuit 42 is released from special channel reception. Thus, the terminal units 35 can no longer receive the rental channel.

The busines channels are used to individually inform employees of the hotel of information or instructions such as a message as shown in FIG. 9. If, in this case, television sets other than those in the guest rooms 2 are used, then the information or message advantageously can be transmitted to the employees without being known to persons other than the employees.

(10) Response of the speical channel

In the case where, as was described above, a particular instruction is issued to allow the specified terminal unit 35 to receive a special channel, sometimes it is necessary to receive an answer from the user of the terminal unit 35 with respect to the special channel. For instance, sometimes it is necessary to confirm whether or not the employees in various sections have received a message or information. In this case, the terminal units 35 are polled by the data transmitter 28 to determine whether or not the response buttons 47 have been operated. The results are applied through the data receiver 29, the data analyzer 30 and the computer 7 to the display unit 10 and therefore can be known immediately. FIG. 10 shows a pattern which requests answers through the rental channel from a number of store buyers in a plurality of guest rooms after a meeting in which new articles available for purchase have been displayed. Thus, the subscribers' intentions can be readily determined.

(11) Turning off the television sets

The television set can be operated by turning on the power switch 48 as described above. If the guest goes out or falls asleep without turning off the power switch 48, then the television set is maintained operated. If, in this case, the television set is still operated after all broadcasts have ended, this is undesirable in the point of view of economical energy use. Accordingly, after all broadcasts have ended, a data signal carrying a turn-off instruction is issued from the data transmitter 28 to all of the terminal units 35. This data signal is applied through the down-data receiver 40 to the communication control circuit 42. The communication control circuit 42 analyzes this data and sends the power control signal c to the power relay 45 to turn off the relay 45. As a result, the supply of electric power to the television sets is suspended. That is, the television sets are forcibly turned off.

(12) Periodic interruption of the supply of electric power to the television sets As was described above, after the television broadcasts have ended, the power sources of all the television sets can be turned off simultaneously. However, sometimes it is necessary to turn off the power supply to some of the television sets during a television broadcast because a person other than a guest may enter an empty guest room or a guest room which is empty because the guest has gone out and operate the television set without permission to view chargeable programs. In order to prevent this, the data transmitter 28 applies down-data signals including the address numbers of particular terminal units to the latter to turn off the power switches thereof. The down-data signals to turn off the power supply are generated periodically, i.e. at short time intervals of several tens of seconds or several minutes for instance. As a result, in the terminal units 35 having the units 35 in empty guest rooms or in guest rooms in which the guest has gone out, the down-data signal is analyzed by the communication control circuit 42 to turn off the power relay 45 periodically. The terminal unit 35 is so designed that, even if the television set 3 is operated by operating the power switch 48, the power supply is periodically turned off. Thus, it is impossible to continuously use the television set. That is, use of the television set is prevented without permission or without paying rental fees. In the case when an empty guest room is occupied by guest or when the guest returns to the room, the down-data signal from the data transmitter 28 is changed to eliminate the address number of the terminal unit 35 in the room so that the television set 3 in the guest room 2 can be normally used.

(18) Summation of the rental fees

As was described above, the video signals are transmitted from the center 4 to all the terminal units 35, so that the television programs can be received by the television sets 3. The conditions of use of the terminal units 35 are detected by the polling which is carried out by the data transmitter 28 periodically. More specifically, the communication control circuits 42 are individually operated by the down-data signals including address numbers which are transmitted by the data transmitter 28 so that the conditions of use of each terminal unit 35 at the time of retrieval are detected. The conditions of use of the terminal unit 35 are relayed back as the up-data signal f to the center 4 by the up-data transmitter 41. This up-data signal is received by the data receiver 29 and is then analyzed by the data analyzer 30 as a result of which the conditions of use are stored in the computer 7. Accordingly, the periods of time of use of each terminal unit 35 and the periods of time or the number of times of receiving the chargeable programs can be readily summed when required and can be displayed on the display unit 10 when the guest checks out of the hotel 1. Accordingly, he can be charged for the use of the television set without problems.

The invention has been described with reference to a CATV system provided in a hotel. However, it should be noted that the invention is not limited thereto or thereby. That is, the technical concept of the invention can be applied to any facility such as large apartments, large buildings and schools in which a number of television sets are simultaneously operated.

As is clear from the above description, according to the invention, it is possible to forcibly cut the power source according to the instruction from the central facility side when the television sets are actuated in the side of the terminal units and left in the on-state for some reason. Furthermore, it is also possible to force the television sets to be inoperative after a predetermined time (e.g. 10 seconds) from an actuation of the set by sending the power cutting instruction from the center to the terminal units periodically (e.g. every 10 seconds).

What is claimed is:

1. In a CATV system in which a central facility is connected through cables to a plurality of terminal units so that various television programs are transmitted from the central facility through the cables to the terminal units, said television sets being supplied with power from a power supply, the improvement comprising a system for shutting off power to selected terminal units to insure that the selected terminal units can not be used, said system comprising:

a down-data transmitter provided in said central facility for periodically sending a down-data signal containing at least a power cutting instruction and an address number of said terminal unit, a down-data receiver provided in each of said terminal units for receiving said down-data signal and a power cutting device provided in each of said terminal units, said power cutting device being responsive to said data received by said down-data receiver to cut the power supply to said television sets when the address information contained in said down-data signal is coincident with its own address.

2. A system as claimed in claim 1 wherein said power switching means at each terminal comprises a power relay interposed between said power supply and said television set, and means responsive to receipt of said power cutting instruction for operating said power relay.

3. A system as claimed in claim 1 further comprising means at said central facility for periodically transmitting said down-data signal with said power cutting instruction and selected address numbers for periodically sending power disconnect instructions to selected terminals.

* * * * *